United States Patent [19]
Lee et al.

[11] Patent Number: 5,868,975
[45] Date of Patent: Feb. 9, 1999

[54] METHOD FOR PREPARING ASYMMETRICAL SEPARATION MEMBRANE FOR SEPARATING WATER/ORGANIC SOLVENT OR GAS

[75] Inventors: Kew-Ho Lee; Jong-Geon Jegal; You-In Park, all of Daejeon, Rep. of Korea

[73] Assignee: Korea Research Institute of Chemical Technology, Daejeon, Rep. of Korea

[21] Appl. No.: 584,075

[22] Filed: Jan. 11, 1996

[30] Foreign Application Priority Data

Jan. 11, 1995 [KR] Rep. of Korea ................ 1995-524
Nov. 20, 1995 [KR] Rep. of Korea ............. 1995-42188

[51] Int. Cl.$^6$ ................ D01D 5/06; D01D 5/247; D01F 6/74
[52] U.S. Cl. ................ 264/41; 264/184; 264/209.1; 264/211.15; 264/211.17
[58] Field of Search ................ 264/41, 101, 184, 264/209.1, 211.14, 211.15, 211.17

[56] References Cited

U.S. PATENT DOCUMENTS 3,835,207  9/1974  Frost et al. ................ 264/41

*Primary Examiner*—Leo B. Tentoni
*Attorney, Agent, or Firm*—Vorys, Sater, Seymour and Pease

[57] ABSTRACT

The present invention provide a method for preparing asymmetric separation membrane having thin skin layer having reduced numbers of pin holes on the surface of the membrane for separating water/organic solvent or gas. Imide type asymmetric hollow fiber membrane according to the present invention has superior separation degree and permeability of water/organic solvent or gas over general imide type asymmetric hollow fiber membrane.

8 Claims, 4 Drawing Sheets

METHOD FOR PREPARING ASYMMETRICAL SEPARATION MEMBRANE FOR SEPARATING WATER/ORGANIC SOLVENT OR GAS

The present invention relates to a method for preparing asymmetric separation membrane, more specifically to a method for preparing asymmetric polyimide type separation membrane for separating water/organic solvent or gas, and a separation membrane prepared therefrom.

BACKGROUND OF THE INVENTION

Generally, separation membranes are useful and economically efficient for separating materials, and many researches have been devoted to the development of them. In particular, a good many researches have been proceeded to find proper materials for membrane as well as proper processes for membrane separation. Until now, various kinds of membrane materials are developed and still are actively studied. Among imide type-polymer which is useful for support of composite membrane, polyetherimide is an excellent membrane material for water/alcohol separation or gas separation (q.v. "K. V. Peinemann: Journal of Membrane Science 27 (1986) 215–216").

Polyetherimide is developed by General Electric Company in a trademark of "ULTEM", which is noncrystalline thermoplastic and has very high glass transition temperature of 215° C. This polyetherimide is considered as one of very important membrane materials having high mechanical strength and heat stability in addition to good separation degree. The preparation of asymmetric hollow fiber from polyetherimide in order to utilize such good properties in the field of separation membrane is reported (q.v. "K. Kneifel and K. V. Peinemann: Journal of Membrane Science, 65 (1992) 295307").

However, in case of preparing asymmetric hollow fiber using polyetherimide, there occurs a problem that pin holes form in the surface of the asymmetric hollow fiber membrane.

Asymmetric hollow fiber membrane consists of surface skin layer of dense structure and lower support layer having larger pores as shown in FIG. 1. Such an asymmetric hollow fiber membrane are subject to influence resulting from the change of conditions in the process of membrane preparation.

In the prior art, asymmetric hollow fiber membrane can be prepared by wet spinning or dry-wet spinning a solution of desired materials. The main factors having effect on the structure of asymmetric hollow fiber membrane are concentration and composition of polymer solution, solvent type of polymer, coagulating agent, spinning temperature or spinning height. Therefore, one can prepare asymmetric hollow fiber membrane having desired structure if he can control properly those factors in the course of preparing asymmetric hollow fiber membrane (qq.v "J. G. Wijmans, P. B. Baaij and C. A. Smolders: Journal of Membrane Science, 14 (1983) 266–274, D. M. Koenhen and H. M. Mulder and C. A. Smolders: Journal of Applied Polymer Science, 21 (1977) 199").

Asymmetric hollow fiber membrane thus prepared has several advantages: Firstly, asymmetric hollow fiber membrane has higher permeability over plain membrane of single material since it has thin skin layer, as shown in FIG. 1. At the same time, it can possess good mechanical strength without having harmful effect on permeability due to high porous, base support. Secondly, asymmetric hollow fiber can be used as a support for composite membrane since it is porous. Herein, a composite membrane means a membrane made by coating membrane material having good separation property thinly on high porous support. Those membranes have merits in improvement of permeability while possessing good separation property.

In spite of having those advantages, it is very difficult to prepare asymmetric hollow fiber membrane having thin skin layer having reduced numbers of pin holes on the surface of membrane. Because of that difficulty, most hollow fiber membrane presently available in the market are in the form of composite membrane using asymmetric hollow fiber. However, such a composite membrane has mechanical property inferior to single material membrane due to complicated process steps.

Therefore, there exists a need to provide a method for preparing asymmetric separation membrane having thin skin layer having reduced numbers of pin holes on the surface of membrane for separating water/organic solvent or gas.

BRIEF DESCRIPTION OF THE INVENTION

FIG. 1 shows an electron micrograph of asymmetric hollow fiber membrane prepared by wet spinning the solution of 25% by weight of N-methyl pyrrolidone in polyetherimide.

FIGS. 2, 3 and 4 show electron micrographs of asymmetric hollow fiber membranes having reduced numbers of pin holes on the surface prepared by reacting the asymmetric hollow fiber membrane shown in FIG. 1 of the present invention in an aqueous solution of base for 30 minutes, 1 hour and 2 hours, respectively.

SUMMARY OF THE INVENTION

Figure 1:
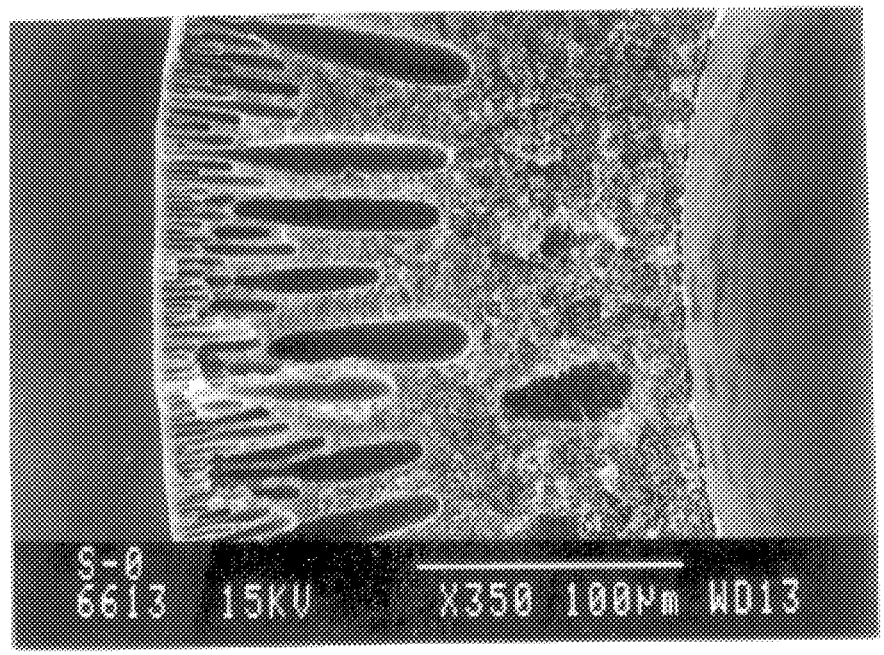
Figure 2:
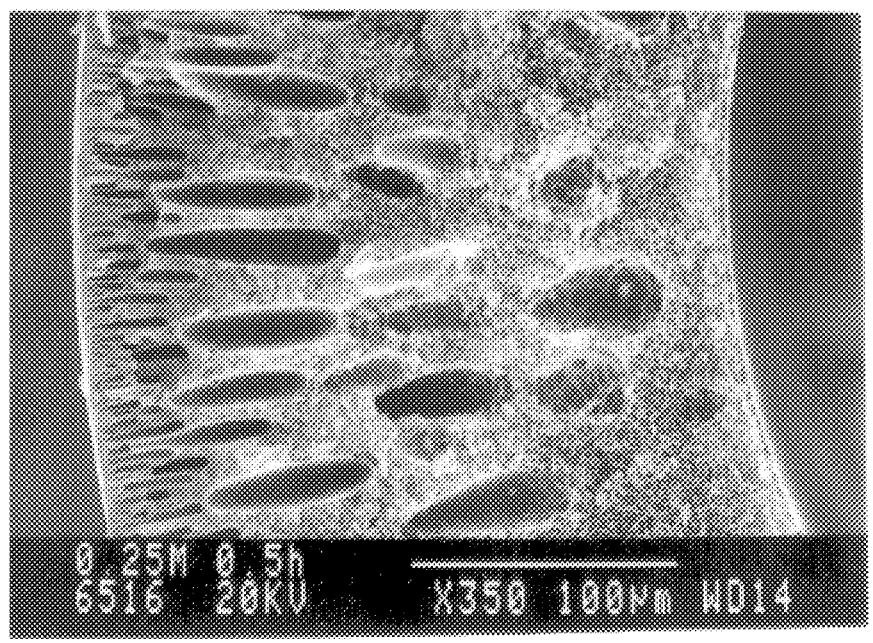
Figure 3:
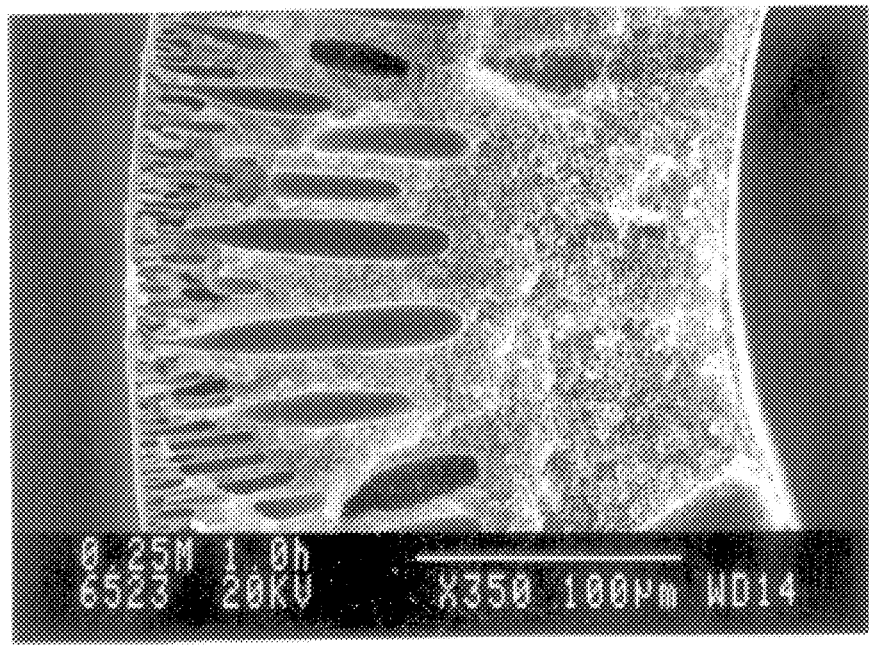
Figure 4:
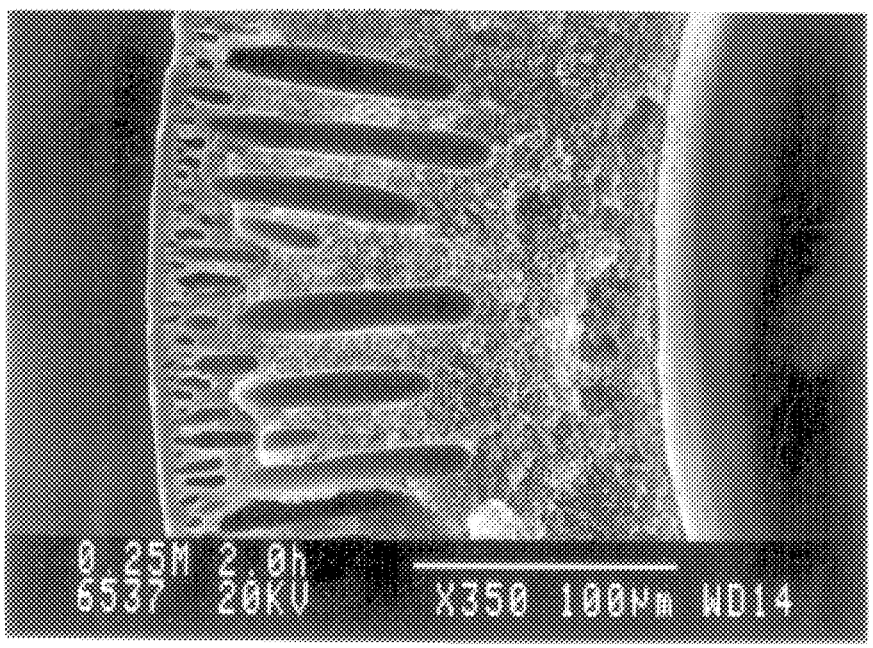

It is an object of the present invention to provide a method for preparing asymmetric separation membrane having reduced numbers of pin holes on the surface of the membrane for separating water/organic solvent or gas by using single material, that is imide type polymer.

It is another object of the present invention to provide an asymmetric separation membrane for separating water/organic solvent or gas prepared by the present method.

Other objects and advantages will be apparent to those of ordinary skill in the art from the following description and drawings.

DETAILED DESCRIPTION OF THE INVENTION

The present invention relates to a method for preparing asymmetric separation membrane and an asymmetric separation membrane prepared therefrom.

In an aspect of the present invention, there is provided a method for preparing asymmetric hollow fiber membrane having thin skin layer having reduced numbers of pin holes on the surface of the membrane for separating water/organic solvent or gas, which comprises wet spinning imide type polymer to give asymmetric hollow fiber membrane, heating the obtained asymmetric hollow fiber membrane, dipping asymmetric hollow fiber membrane in an aqueous solution of base for prescribed time, maintaining the membrane in an excess of distilled water for prescribed time and drying the membrane under vacuum.

In an another aspect of the present invention, there is provided a method for preparing asymmetric plain membrane for separating water/organic solvent or gas, which comprises applying imide type polymer solution onto nonwoven fabric by phase transfer process to form membrane, heating the prepared imide type polymer membrane and then dipping the heat treated membrane in aqueous solution of base for prescribed time and if necessary, maintaining the membrane in an excess of distilled water for predetermined time and drying the membrane under vacuum.

In the present invention, materials for asymmetric hollow fiber membrane and plain membrane can be polyimides, preferably polyetherimides.

The aqueous solution of base used in the present invention is any aqueous solution of base reactive enough to open imide ring and to change it into amic acid. Preferable examples of aqueous solution of base are those of alkali or alkaline earth compounds, such as sodium hydroxide or potassium hydroxide.

In the present method for preparing asymmetric hollow fiber membrane, concentration of the aqueous solution of base is preferably 0.01 to 10 mole. In the case that concentration of the aqueous solution of base is less than 0.01 mole, the reaction of the aqueous solution of base with imide group of polyetherimide is not sufficient. On the other hand, in the case that concentration of the aqueous solution of base is higher than 10 mole, too many imide ring reaction result in the degradation of polymer rather than modification of polyimide and thus the physical and chemical stability of membrane prepared are severely deteriorated.

In the same manner, in the cases that reaction time is less than 1 second, the reaction of the aqueous solution of base with imide group of polyetherimide is not sufficient. If it is longer than 10 hours, too many ring opening of imide ring result in the degradation of polymer, and thus the physical and chemical stability of membrane prepared are also severely deteriorated. Therefore, in the present invention, the reaction time in aqueous solution of base is preferably 1 second to 10 hours.

It is preferred that the asymmetric hollow fiber membrane is maintained in distilled water for 10 to 30 hours after the asymmetric hollow fiber membrane is reacted in aqueous solution of base.

Now, the present invention will be described more specifically with reference to examples hereafter, however it should be noted that the present invention is not intended to be restricted within those specific examples.

EXAMPLE 1

A solution of 25% by weight of polyetherimide dissolved in N-methyl pyrrolidone was subjected to wet spinning in water containing external coagulating agent to give asymmetric hollow fiber membrane. The obtained hollow fiber membrane was placed in 50° C. water and heat treated for 24 hours. The heat treated asymmetric hollow fiber membrane was placed in 1 mole of aqueous solution of sodium hydroxide and reacted for 30 minutes. Thus treated membrane was maintained in an excess of distilled water for 24 hours and then dried under vacuum to give asymmetric hollow fiber membrane having thin skin layer having reduced numbers of pin holes on the surface of the membrane.

EXAMPLE 2

The procedure described in Example 1 was repeated except that the asymmetric hollow fiber membrane obtained by wet spinning was reacted in 1 mole of sodium hydroxide solution for 1 hour to give asymmetric hollow fiber membrane having thin skin layer having reduced numbers of pin holes on the surface of the membrane.

EXAMPLE 3

The procedure described in Example 1 was repeated except that the asymmetric hollow fiber membrane obtained by wet spinning was reacted in 1 mole of sodium hydroxide solution for 1.5 hours to give asymmetric hollow fiber membrane having thin skin layer having reduced numbers of pin holes on the surface of the membrane.

EXAMPLE 4

The procedure described in Example 1 was repeated except that the asymmetric hollow fiber membrane obtained by wet spinning was reacted in 1 mole of sodium hydroxide solution for 2 hours to give asymmetric hollow fiber membrane having thin skin layer having reduced numbers of pin holes on the surface of the membrane.

EXAMPLE 5

The procedure described in Example 1 was repeated except that the asymmetric hollow fiber membrane obtained by wet spinning was reacted in 1 mole of sodium hydroxide solution for 3 hours to give asymmetric hollow fiber membrane having thin skin layer having reduced numbers of pin holes on the surface of the membrane.

EXAMPLE 6

The procedure described in Example 1 was repeated except that the asymmetric hollow fiber membrane obtained by wet spinning was reacted in 1 mole of sodium hydroxide solution for 4 hours to give asymmetric hollow fiber membrane having thin skin layer having reduced numbers of pin holes on the surface of the membrane.

COMPARATIVE EXAMPLE 1

A solution of 25% by weight of polyetherimide dissolved in N-methyl pyrrolidone was subjected to wet spinning in water containing external coagulating agent to give asymmetric hollow fiber membrane, as stated in Example 1. The prepared hollow fiber membrane was placed in 50° C. water for 24 hours and heat treated.

Water/isopropanol separation test was carried out using asymmetric hollow fiber membranes having thin skin layer having reduced numbers of pin holes on the surface of the membrane prepared in Examples 1 to 6 according to the present invention and the existing hollow fiber membrane prepared in Comparative Example 1. The test results are summarized in Table 1.

TABLE 1

| Separation of water/isopropanol mixture (10/90 ratio by weight) | | |
|---|---|---|
| Example | Selectivity | Permeability(kg/m$^2$.h) |
| 1 | 25 | 0.44 |
| 2 | 33 | 0.37 |
| 3 | 47 | 0.32 |
| 4 | 52 | 0.29 |

TABLE 1-continued

Separation of water/isopropanol mixture
(10/90 ratio by weight)

|  | Selectivity | Permeability(kg/m².h) |
|---|---|---|
| 5 | 52 | 0.29 |
| 6 | 53 | 0.28 |
| Comparative Example | | |
| 1 | 11 | 0.18 |

As seen from the Table 1, the water/isopropanol separation property of the polyetherimide type asymmetric hollow fiber membrane according to the present invention is superior to that of the existing hollow fiber membrane. Accordingly, it is expected that asymmetric hollow fiber membrane made of imide type polymer according to the present invention are very useful in the separation of water/organic solvent.

EXAMPLE 7

A solution of 25% by weight of polyetherimide dissolved in N-methyl pyrrolidone was subjected to wet spinning in water containing external coagulating agent to give asymmetric hollow fiber membrane. The obtained hollow fiber membrane was placed in 90° C. water for 24 hours and heat treated at 70° C. for 3 hours. The heat treated asymmetric hollow fiber membrane was placed in 0.25 mole of aqueous solution of sodium hydroxide and reacted for 30 minutes. Thus treated membrane was maintained in an excess of distilled water for 24 hours and then dried under vacuum to give asymmetric hollow fiber membrane having thin skin layer having reduced numbers of pin holes on the surface of the membrane.

EXAMPLE 8

The procedure described in Example 7 was repeated except that the asymmetric hollow fiber membrane obtained by wet spinning was reacted in 0.25 mole of sodium hydroxide solution for 1 hour to give asymmetric hollow fiber membrane having thin skin layer having reduced numbers of pin holes on the surface of the membrane.

EXAMPLE 9

The procedure described in Example 7 was repeated except that the asymmetric hollow fiber membrane obtained by wet spinning was reacted in 0.25 mole of sodium hydroxide solution for 2 hours to give asymmetric hollow fiber membrane having thin skin layer having reduced numbers of pin holes on the surface of the membrane.

COMPARATIVE EXAMPLE 2

A solution of 25% by weight of polyetherimide dissolved in N-methyl pyrrolidone was subjected to wet spinning in water containing external coagulating agent to give asymmetric hollow fiber membrane, as stated in Example 7. The prepared hollow fiber membrane was placed in 90° C. water for 24 hours and heat treated at 70° C. for 3 hours.

Permeation test of nitrogen/carbon dioxide mixed gas was carried out using asymmetric hollow fiber membranes having thin skin layer having reduced numbers of pin holes on the surface of the membrane prepared in Examples 7 to 9 according to the present invention and the existing hollow fiber membrane prepared in Comparative Example 2. The permeation test was carried out as follows: The surface of the membrane was wetted using vapor during gas permeation test and the pressure difference was maintained 1.5 atmosphere by using vacuum pump. The permeated gas was analyzed by gas chromatography at 25° C. The test results were summarized in Table 2.

TABLE 2

Separation of nitrogen/carbon dioxide mixture
(80/20 concentration ratio)

|  | Selectivity | Permeability (Q × 10⁻⁷ cm⁻³/ cm².cmHg.sec) |
|---|---|---|
| Example | | |
| 7 | 42 | 2.07 |
| 8 | 43 | 1.99 |
| 9 | 42 | 1.78 |
| Comparative Example | | |
| 2 | 8 | 4.76 |

Figure 5:
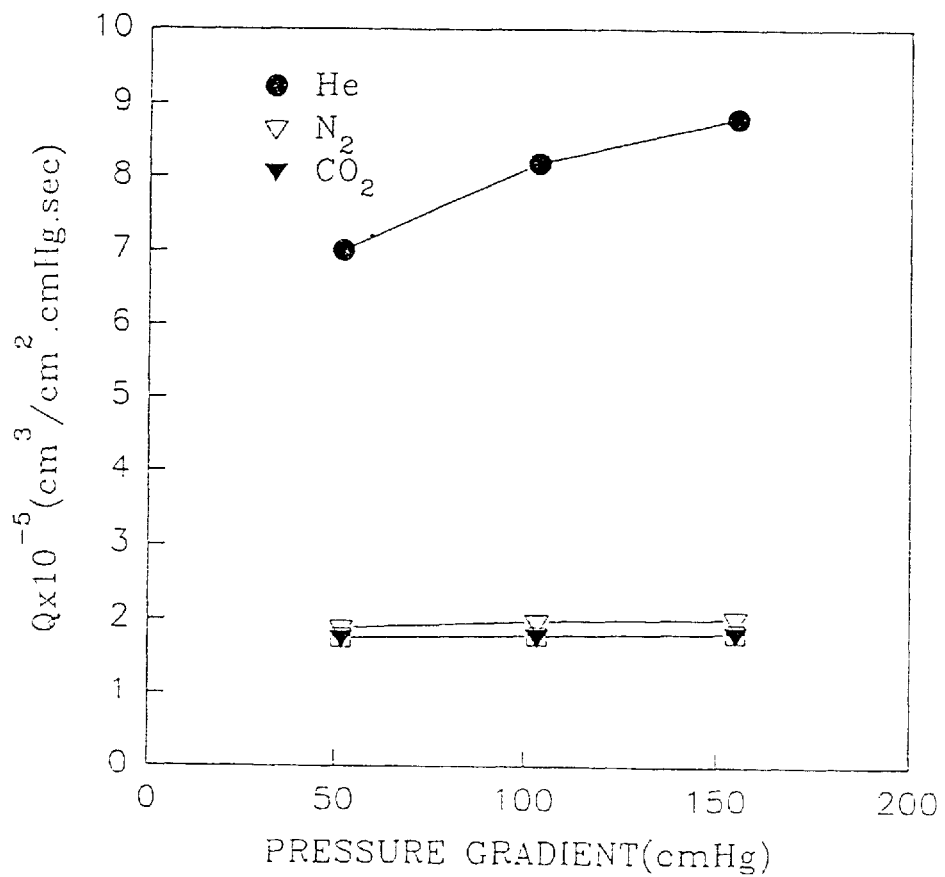
FIG. 5 shows a graph of gas permeation test using asymmetric hollow fiber membrane prepared in Comparative Example 2.
Figure 6:
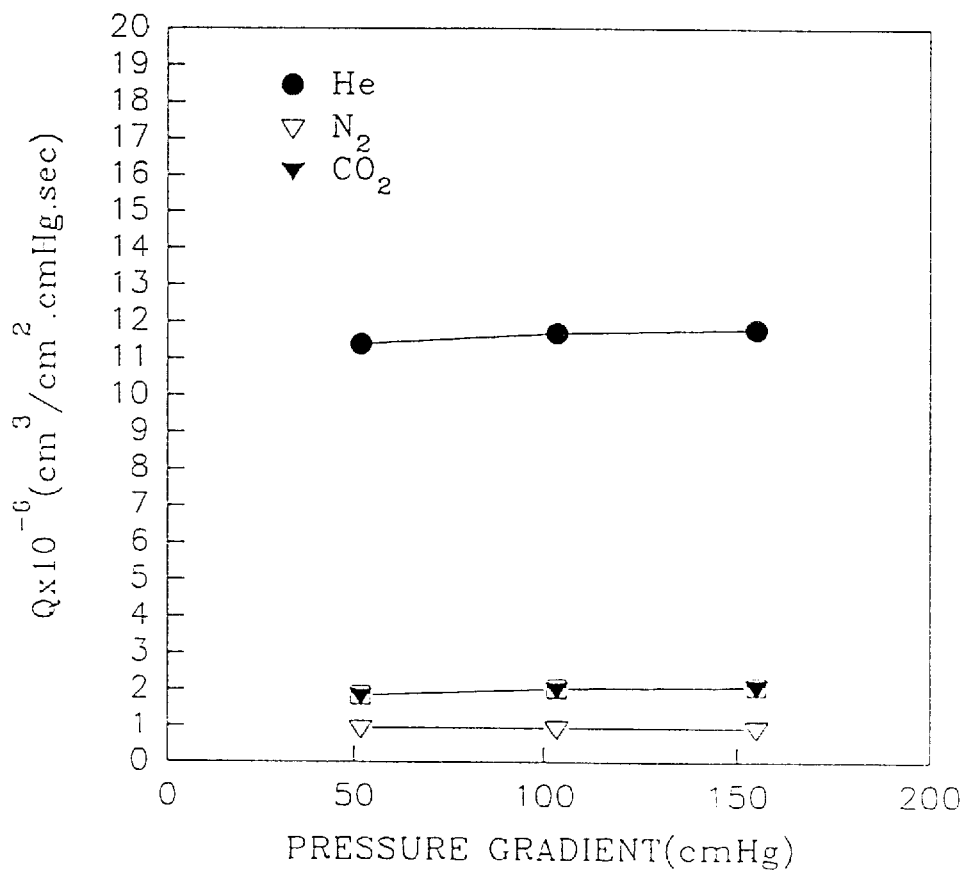
FIG. 6 shows a graph of gas permeation test using asymmetric hollow fiber membrane prepared in Example 7.

Furthermore, gas permeation test of helium, nitrogen and carbon dioxide was also carried out using asymmetric hollow fiber membranes prepared by the comparative Exmaple 2 and Example 7 and the results were summarized in FIGS. 5 and 6, respectively. The permeation test was carried out as follows: The surface of the membrane was maintained dry during gas permeation test. The permeability was measured at 25° C. by mass flow meter with maintaining lower membrane pressure at atmosphere condition while adjusting upper membrane pressure within the certain pressure region by using pressure regulator.

As seen from the FIGS. 5 and 6, the nitrogen/carbon dioxide mixed gas separation property of the polyetherimide type asymmetric hollow fiber membrane according to the present invention is superior to that of the existing hollow fiber membrane. Accordingly, it is expected that asymmetric hollow fiber membrane made of imide type polymer according to the present invention are very useful in the separation of mixed gas.

What is claimed is:

1. A method for preparing asymmetric hollow fiber membrane having thin skin layer having reduced numbers of pin holes on the surface of the membrane for separating water/organic solvent or gas, which comprises wet spinning imide type polymer to give asymmetric hollow fiber membrane, heating the obtained asymmetric hollow fiber membrane, dipping asymmetric hollow fiber membrane in an aqueous solution of base for prescribed time, maintaining the membrane in an excess of distilled water for prescribed time and drying the membrane under vacuum.

2. A method for preparing asymmetric hollow fiber membrane for separating water/organic solvent or gas according to claim 1, the material of asymmetric hollow fiber membrane is polyimide.

3. A method for preparing asymmetric hollow fiber membrane for separating water/organic solvent or gas according to claim 2, the polyimide is polyetherimide.

4. A method for preparing asymmetric hollow fiber membrane for separating water/organic solvent or gas according to claim 1, the aqueous solution of base is that of alkali or alkaline earth compound.

5. A method for preparing asymmetric hollow fiber membrane for separating water/organic solvent or gas according to claim 4, the aqueous solution of base is that of sodium hydroxide or potassium hydroxide.

6. A method for preparing asymmetric hollow fiber membrane for separating water/organic solvent or gas according to claim 5, the concentration of the aqueous solution of base is 0.01 to 10 mole.

7. A method for preparing asymmetric hollow fiber membrane for separating water/organic solvent or gas according to claim 1, the dipping time in aqueous solution of base is 1 second to 10 hours.

8. A method for preparing asymmetric hollow fiber membrane for separating water/organic solvent or gas according to claim 1, the asymmetric hollow fiber membrane is maintained in distilled water for 10 to 30 hours.

* * * * *